United States Patent [19]
Izumi

[11] Patent Number: 5,949,828
[45] Date of Patent: *Sep. 7, 1999

[54] TDMA SYSTEM RECEIVER

[75] Inventor: Seiichi Izumi, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/580,315

[22] Filed: Dec. 28, 1995

[30] Foreign Application Priority Data

Jan. 13, 1995 [JP] Japan .................................. 7-004308

[51] Int. Cl.[6] .............................. H04L 27/14; H04L 27/16
[52] U.S. Cl. .......................... 375/326; 375/375; 370/512
[58] Field of Search ..................................... 375/316, 326, 375/327, 340, 343, 373, 376, 375; 370/503, 512, 509; 329/306

[56] References Cited

U.S. PATENT DOCUMENTS

| | | | |
|---|---|---|---|
| 4,652,834 | 3/1987 | McAdam | 375/340 |
| 5,031,193 | 7/1991 | Atkinson et al. | 375/231 |
| 5,177,740 | 1/1993 | Toy et al. | 370/503 |
| 5,245,611 | 9/1993 | Ling et al. | 370/503 |
| 5,418,778 | 5/1995 | Cummiskey et al. | 370/276 |
| 5,442,653 | 8/1995 | Saito | 375/219 |

*Primary Examiner*—Chi H. Pham
*Assistant Examiner*—Bryan Webster
*Attorney, Agent, or Firm*—Jay H. Maioli

[57] ABSTRACT

A TDMA system receiver detects an offset amount of a carrier frequency of a received signal. A receiver for receiving a signal, including a periodic burst signal, includes a receiver unit for receiving a signal including a burst signal, a phase detecting circuit for detecting a phase of a predetermined pattern in a first burst signal and for detecting a phase of a predetermined pattern in a second burst signal, a calculating circuit for calculating an offset amount of a carrier frequency, and a correcting unit for correcting the offset amount of the carrier frequency.

14 Claims, 4 Drawing Sheets

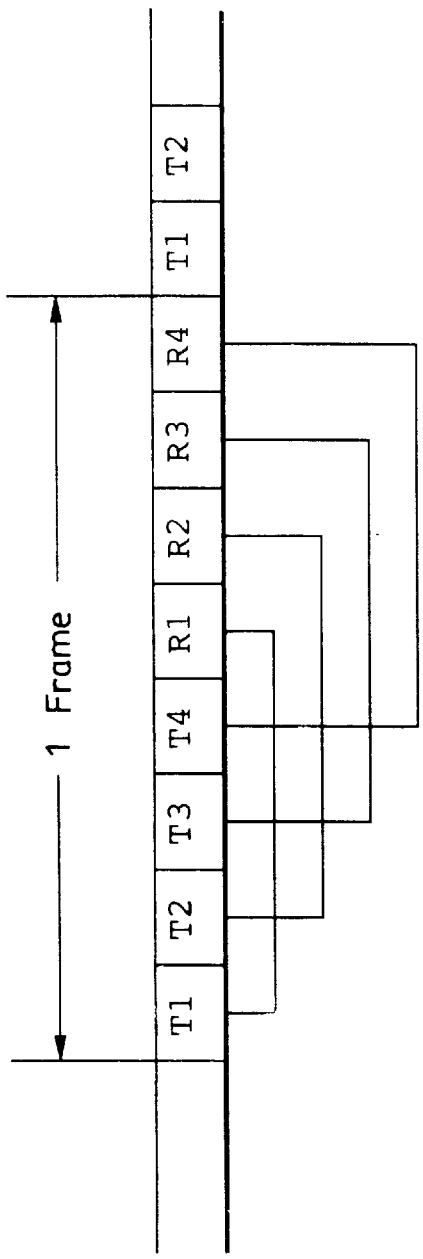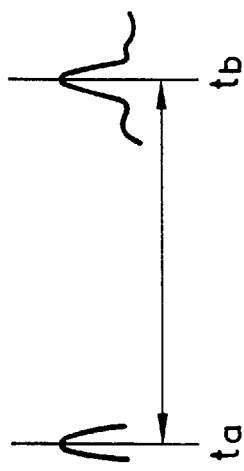
FIG. 1 (PRIOR ART)
FIG. 2A (PRIOR ART)
FIG. 2B (PRIOR ART)

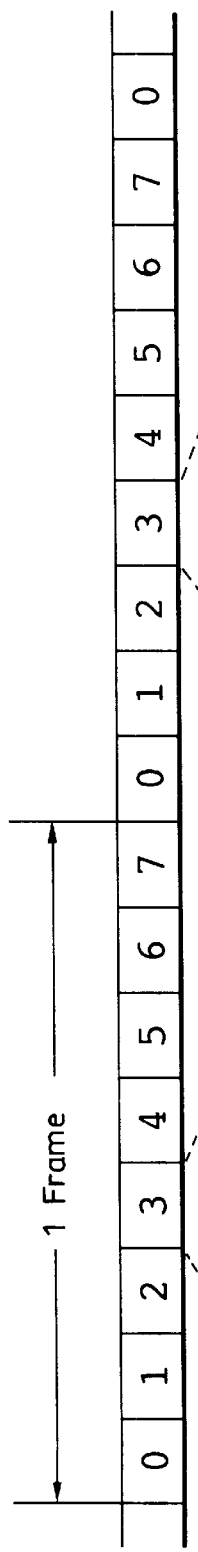
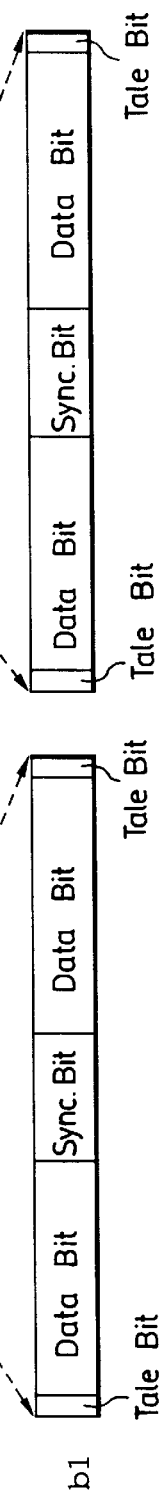
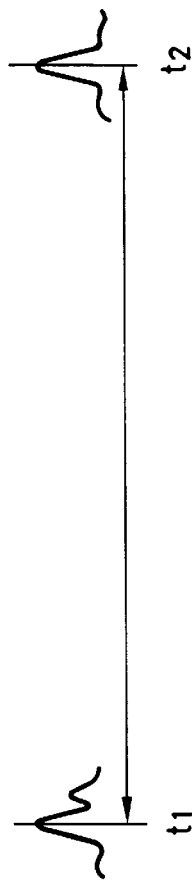
FIG. 4A
FIG. 4B
FIG. 4C
FIG. 4D

TDMA SYSTEM RECEIVER

BACKGROUND OF THE INVENTION

1. Field of the Invention

The present invention relates to a time division multiple access (TDMA) system receiver for intermittently receiving burst data.

2. Description of the Related Art

A communication system called a time division multiple access (TDMA) communication system is applied to a digital radio telephone system. FIG. 1 is a diagram showing an example of a frame arrangement according to the TDMA communication system. In FIG. 1, one frame is divided into a plurality of time slots (eight time slots in this arrangement). Of the eight time slots, four time slots are allocated to transmission slots T1, T2, T3, and T4, and the other four time slots are allocated to reception slots R1, R2, R3, and R4. In the TDMA communication system, data is transmitted and received between two transceivers by employing the slots T1 and R1 as the transmission and reception slots respectively, and at the same time data is transmitted and received by two other transceivers by also respectively employing the slots T2 and R2 as the transmission and reception slots. As described above, when one frame is composed of eight time slots, it is possible to transmit and receive data of four transmission-reception systems at maximum capacity with one channel.

Other than the above communication system in which the data is transmitted and received with the same channel (frequency), there is a communication system in which a transmission channel and a reception channel are independently provided and a time division multiple access communication is carried out in each channel.

When such a communication system is employed, an offset amount of a carrier frequency of a received signal is detected by comparing phases of channel responses between two points in a burst data received in each time slot.

FIG. 2A shows an example of the burst data transmitted in each time slot. In FIG. 2A, the burst data includes a tail bit portion, a first half of a data bit portion, a sync. bit portion, a second half of the data bit portion, and a tail bit portion which are arranged therein in that order. The sync. bit portion is located at the center of one burst. The tail bit portion and the sync. bit portion are data having predetermined patterns.

Accordingly, it is easy to detect the tail bit portion and the sync. bit portion from the received data. It is also possible to detect an offset amount of the carrier frequency based on the detected phases of the tail bit portion and the sync. bit portion. Specifically, as shown in FIG. 2B, there is detected a position ta at which a value of a correlation function between the head tail bit portion of the received data and the data of the tail bit portion previously stored in a receiver become maximum.

There is also detected a position tb at which a value of a correlation function between the sync. bit portion of the received data and data of the sync. bit portion previously stored in the receiver becomes maximum.

The difference between the phases of the two detected positions ta and tb (phase difference relative to a phase of the carrier frequency) is detected to calculate the offset amount of the carrier frequency. The received signal is corrected by the offset amount of the carrier frequency to obtain a precise received data.

However, when the offset amount of the carrier frequency is detected and processed as described above, the detected offset amount of the carrier frequency is not sufficiently large as compared with an offset amount caused by other factors such as a noise or the like.

Therefore, accuracy with which the offset amount of the carrier frequency is detected is low.

In other words, since in the above TDMA communication system the burst data is received intermittently, time difference between the two positions in one burst data is not so large (e.g., one burst is about several 100s of $\mu$ second). Therefore, it is difficult to satisfactorily detect the offset amount of the carrier frequency without any influence of noise.

The one burst includes known bit patterns of the tail bit portion and the sync. bit portion as described above. Since the tail bit portion has a small number of bits, it is difficult to detect a sufficient correlation from the tail bit portion. When the tale bit portion is used to detect the phase difference, it is difficult to obtain a sufficient detection accuracy. In order to avoid such problem, it is possible to consider that the phase difference between two positions in the sync. bit portion of the one burst is detected. However, in this case, since the time between the two positions is very short, the influence of the noise upon the detected phase difference is more pronounced.

SUMMARY OF THE INVENTION

In view of such aspects, an object of the present invention is to provide a TDMA system receiver which can satisfactorily detect and correct an offset amount of the carrier frequency of a received signal.

According to a first aspect of the present invention, a receiver for receiving a signal including a periodic burst signal includes a receiving means for receiving a signal including a burst signal, a phase detecting means for detecting a phase of a predetermined pattern in a first burst signal and for detecting a phase of a predetermined pattern in a second burst signal, a calculating means for calculating an offset amount of a carrier frequency, and a correcting means for correcting the offset amount of the carrier frequency.

According to a second aspect of the present invention, a communication apparatus includes a receiving means for receiving a signal including a burst signal, a phase detecting means for detecting a phase of a predetermined pattern in a burst signal and for detecting a phase of a predetermined pattern in a previously stored burst signal, a calculating means for calculating an offset amount of a carrier frequency, a correcting means for correcting the offset amount of the carrier frequency, a transmitting means for transmitting an RF signal, an antenna for receiving and transmitting a radio wave, and a switching means for switching connection of the antenna.

According to a third aspect of the present invention, when a signal including a periodic burst signal is received, a phase of a predetermined pattern in a first burst signal is detected and a phase of a predetermined pattern in a second burst signal is detected. An offset amount of a carrier frequency is calculated. The offset amount of the carrier frequency is corrected.

BRIEF DESCRIPTION OF THE DRAWINGS

FIG. 1 is a diagram showing an arrangement of time slots according to a TDMA system;

FIGS. 2A and 2B are diagrams used to explain an example of the detection of an offset amount of a carrier frequency;

FIGS. 4A to 4D are diagrams used to explain the detection of an offset amount of a carrier frequency according to the embodiment.

DESCRIPTION OF THE PREFERRED EMBODIMENT

Figure 5:
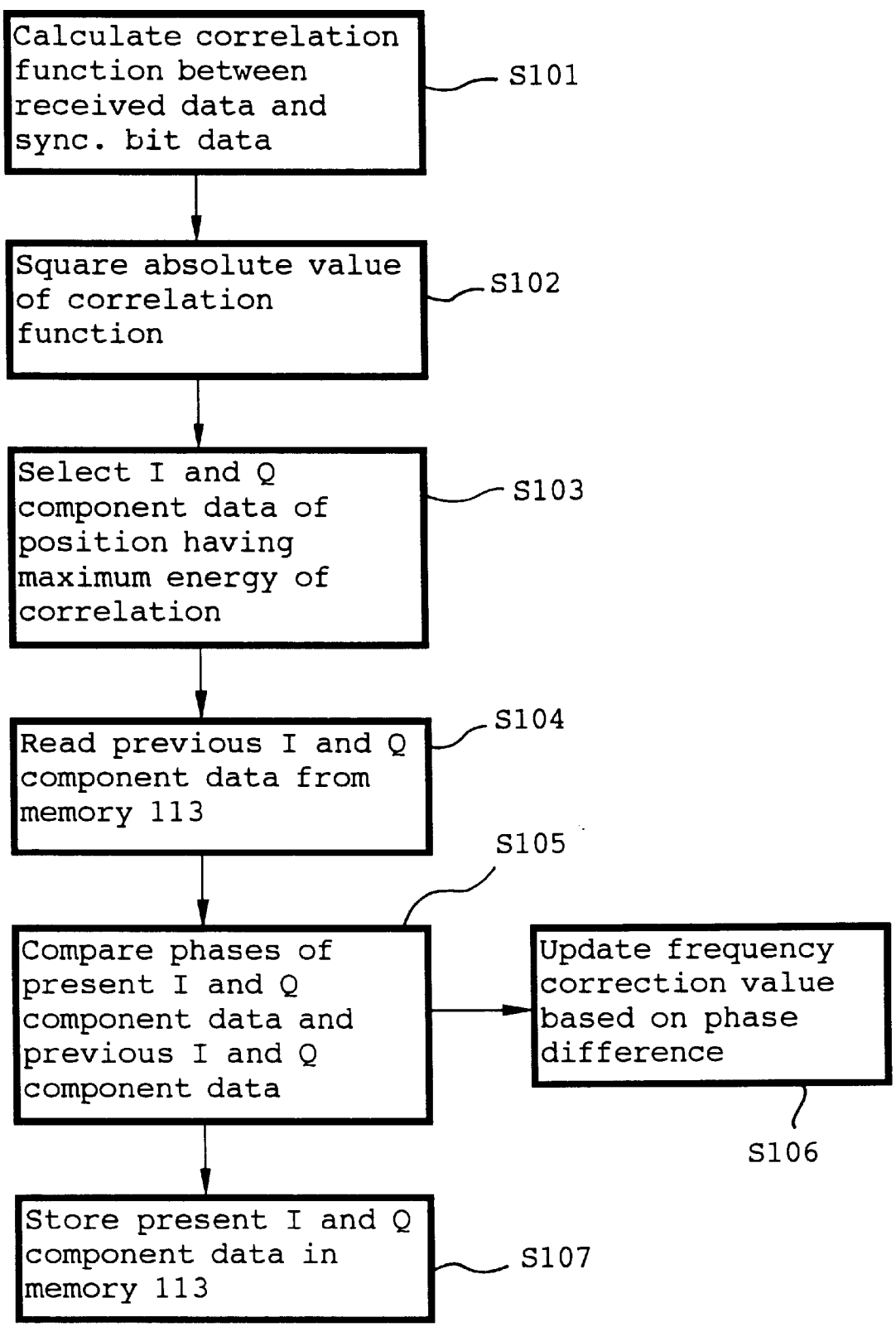
FIG. 5 is a flowchart showing a process for detecting the offset amount of the carrier frequency according to the embodiment.

A TDMA system receiver according to an embodiment of the present invention will hereinafter be described with reference to FIGS. 3 to 5.

Figure 3:
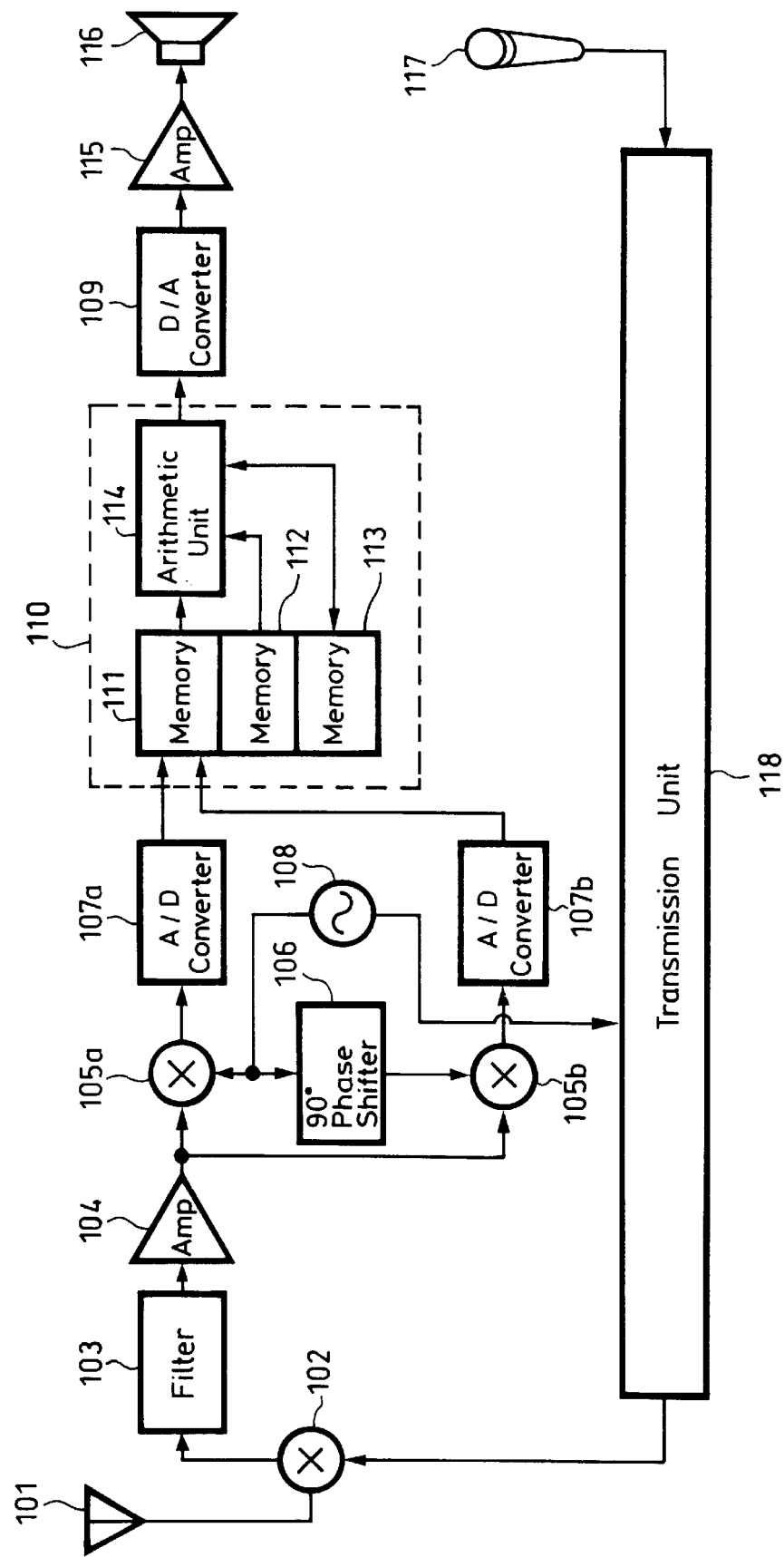
FIG. 3 is a diagram showing an arrangement of a TDMA system receiver according to an embodiment of the present invention.

FIG. 3 is a diagram showing an arrangement of a TDMA system radio telephone device to which the present invention is applied. As shown in FIG. 3, a signal received by an antenna 101 is supplied therefrom through a selector 102 to a filter 103. The filter 103 extracts a desired received frequency band from the received signal. The antenna selector 102 supplies the signal received by the antenna 101 to a reception system and also supplies to the antenna 101 a transmission signal supplied thereto from a transmission unit 118. When a transmission frequency is different from a reception frequency, the antenna selector 102 is formed of two filters having different center frequencies. When the transmission frequency and the reception frequency are identical to each other, the antenna selector 102 is formed of a switch for switching, depending upon whether a time slot is a transmission slot or a reception slot, a circuit to which the antenna selector 102 is connected.

A signal output from the filter 103 is supplied to an amplifier 104. The amplifier 104 amplifies the output signal and supplies the amplified signal to frequency-conversion mixers 105a, 105b. The mixers 105a, 105b mix the amplified signal output from the amplifier 104 with a signal supplied from an oscillator 108. The signal supplied from the oscillator 108 to the mixer 105b is supplied through a 90° phase shifter 106. Accordingly, the mixers 105a, 105b carry out orthogonal detection (orthogonal conversion) which generates the signals whose phases are shifted by 90°.

In the orthogonal detection, the mixer 105a converts the received signal into a baseband signal of an I component included in the received signal, and the other mixer 105b converts the received signal into a baseband signal of a Q component included in the received signal. The mixer 105a supplies the I component baseband signal to an analog-to-digital (A/D) converter 107a. The mixer 105b supplies the Q component baseband signal to an A/D converter 107b. The A/D converters 107a, 107b convert the supplied baseband signal to the digital data and supplies the digital data to a memory 111 of a demodulating unit 110. The memory 111 temporarily stores the supplied digital data therein.

The demodulating unit 110 carries out some data processings such as demodulation of the received data, channel codec, voice codec, decoding and so on. The demodulating unit 110 includes an arithmetic unit 114. The arithmetic unit 114 carries out the above data processings to obtain a digital audio data of a predetermined format. The demodulating unit 110 includes memories 112, 113 other than the memory 111. The memory 112 previously stores a sync. bit pattern of the received data. The memory 113 stores data, such as an impulse response or the like, calculated by the arithmetic unit 114.

The demodulating unit 110 supplies the digital audio data to a digital-to-analog (D/A) converter 109. The D/A converter 109 converts the digital audio data into an analog audio signal and supplies the analog audio signal to an amplifier 115. The amplifier 115 amplifies the supplied analog audio signal and supplies the amplified analog audio signal to a speaker 116. The speaker 116 emanates the corresponding sounds.

In the transmission system, a microphone 117 picks up a sound and converts it into an audio signal. The microphone 117 supplies the audio signal to the transmission unit 118. The transmission unit 118 carries out transmission processings which are similar to the above reception processings, thereby obtaining a transmission signal. The transmission unit 118 supplies the transmission signal through the antenna selector 102 to the antenna 101. The antenna 101 transmits the transmission signal in the form of a radio wave. Since the communication system in this embodiment is a TDMA communication system in which the transmission frequency is identical with the reception frequency, the oscillator 108 provided in the reception system supplies its output signal to the transmission unit 118.

A process of correcting an offset amount of a carrier frequency when the device of this embodiment receives a signal will be described with reference to FIGS. 4A to 4D and 5.

The arithmetic unit 114 provided in the demodulating unit 110 carries out the process of correcting the offset amount of the carrier frequency. Initially, the radio telephone device receives burst data of two successive frames. In this case, it is assumed that the communication system is the TDMA communication system in which one frame is formed of eight time slots as shown in FIG. 4A. A burst signal to be received by the radio telephone device is transmitted at a predetermined time slot of each frame. Assuming that a signal transmitted at a time slot 3 is received as shown in FIG. 4A, the radio telephone device receives a burst signal b1 transmitted at the time slot 3 of a certain frame and receives a burst signal b2 of a time slot 3 of the subsequent frame.

As shown in FIG. 4B, the burst signals b1, b2 have the same data of the sync. bit portions at their center portions and data bit portions which are located before and after the sync. bit portions, including audio data and so on. The offset amount of the carrier frequency is detected by using the two burst signals b1, b2.

In this process of detecting the offset amount of the carrier frequency, it is not always necessary to simultaneously store the two received burst data in the memory. Instead the following arrangement may be employed. Specifically, after the first burst signal is received and subjected to a processing (calculation of its phase), only the processed data of the first burst signal is stored. Subsequently, after the subsequent burst signal is received and subjected to the same processing, only the processed data of the subsequent burst signal is stored. Then, the processed data of the two burst signals are compared.

The process of detecting the offset amount of the carrier frequency by using the burst signals b1, b2 will hereinafter be described with reference to FIG. 5 which is a flowchart thereof.

When the two burst signals have been stored in the memory 111 provided in the demodulating unit 110, the arithmetic unit 114 calculates a correlation function between the sync. bit data previously stored in the memory 112 and the received data of the burst signal (in step S101). The arithmetic unit 114 squares an absolute value of the calculated correlation function (in step S102). Based on the squared value of the absolute value of the correlation function, the arithmetic unit 114 selects an I component data, and a Q component data of a portion where an energy of the correlation becomes maximum, from the data stored in the memory 111 (in step S103).

If the memory 113 stores an I component data and a Q component data of a portion, where an energy of the correlation becomes maximum, of the first burst signal received one-frame before the burst signal, then the arithmetic unit 114 reads out the I component data and the Q component data from the memory 113 (in step S104). The arithmetic unit 114 compares the phase formed by the read-out I component data and the read-out Q component data, whose phases are shifted by 90° from each other, of the burst signal with the phase formed by the previous I component data and the Q component data, whose phases are shifted by 90° from each other, of the burst signal (in step S105).

Specifically, when the burst signal b2 shown in FIG. 4B is subjected to the processing, for example, the arithmetic unit 114 compares a data phase (a phase corresponding to the burst signal shown in FIG. 4B) of the position (a timing t2 shown in FIG. 4C), where the correlation in the sync. bit portion of the burst signal b2 becomes maximum, with a data phase (a phase corresponding to the burst signal shown in FIG. 4B) of a position (a timing t1 shown in FIG. 4C) where the correlation in the sync. bit portion of the burst signal b1 one-frame previous to the burst signal b2 becomes maximum.

A phase difference detected by the above comparison is determined as the offset amount of the carrier frequency. Based on the detected phase difference, a carrier-frequency correction amount used for calculation carried out by the arithmetic unit 114 is updated (in step S106). When the carrier frequency is corrected, the arithmetic unit 114 offsets phases of demodulated data by the determined offset amount. The arithmetic unit 114 stores in the memory 113 the I component data and the Q component data of the position where the correlation in the sync. bit portion of the burst signal of the present frame, to use the stored I and Q component data in the correction processing for the next frame (in step S107).

When the phase difference between the burst signals of the plurality of frames is measured to detect the offset amount of the carrier frequency and correct the data as described above, it is possible to detect the offset amount of the carrier frequency and correct the data satisfactorily. Specifically, it is possible to considerably increase an interval between the two positions used to detect the phase difference as compared with a process of detecting the offset amount of the carrier frequency based on the phase difference between the two positions in one burst signal. Therefore, it is possible to sufficiently reduce the noise included in the detected phase difference. As a result, it is possible to detect the offset amount of the carrier frequency with satisfactory accuracy and with less influence by the noise.

In the TDMA communication system employed in this embodiment, of one transmitted burst signal, only the sync. bit portion has a known pattern having a considerably large number of bits. According to the present invention, it is possible to detect the offset amount of the carrier frequency by using only the phase difference calculated based on the correlation detected by comparison of the sync. bit portions of the plural frames. As a result, it becomes unnecessary to use a known pattern having a small number of bits such as a tail bit portion. Therefore, it is possible to detect the correlation in each burst signal with satisfactory accuracy. From this standpoint, the accuracy with which the offset amount is detected is improved.

The process of detecting the correlation function between the sync. bit portions is necessary for synchronizing the operation of circuits in the reception system with the received burst data. Accordingly, the calculation necessary for detection of the offset amount of the carrier frequency is carried out simultaneously with the above synchronization processing, which can reduce an amount and time of the calculation required only for the detection of the offset amount. Therefore, it is possible to reduce the consumed power of the radio telephone device. Since the consumed power is reduced, it is possible to increase duration time of a battery used with a portable apparatus such as a portable telephone or the like.

Subsequently, it will be described with equations that the offset amount of the carrier frequency can be detected by the arrangement according to this embodiment. Assuming that a phase difference $\Delta\phi$ is a phase difference between a data phase $\theta 1$ (shown in FIG. 4D) obtained at the position t1 (shown in FIG. 4C) where the correlation (impulse response) in the sync. bit portion of the burst signal b1 becomes maximum, and a data phase $\theta 2$ (shown in FIG. 4D) obtained at the position t2 (shown in FIG. 4C) where the correlation (impulse response) in the sync. bit portion of the burst signal b2 becomes maximum, the phase difference $\Delta\phi$ is expressed by the following equation:

$$\Delta\phi = 2\pi\Delta FT + \theta_{noise} \quad (1)$$

where $\Delta F$ is the offset amount of the carrier frequency, $\theta_{noise}$ is a phase difference resulting from the noise and so on, and T is a time interval between t1 and t2.

Based on the equation (1), the offset amount $\Delta F$ of the carrier frequency is defined by the following equation:

$$\Delta F = \frac{\Delta\phi - \theta_{noise}}{2\pi T} \quad (2)$$

Study of the equation (2) reveals that the larger the time interval T is, the less the influence of the noise becomes.

It is because phases other than an initial phase are determined by bits i a TDMA communication system (e.g., a radio telephone system called a global system for mobile communication) that the offset amount of the carrier frequency can be calculated from the phase difference as described above. When the phase difference between the frames in both of which the same bits are reheated is calculated, the initial phase is canceled by subtraction, thereby a difference component such as the offset amount of the carrier frequency and the noise remains. For example, in the global system for mobile communication (GSM), a differential code is included in the signal. Assuming that $\phi n$ is a phase at a bit n and bn is a data at the bit n, a phase of a modulated signal in the GSM is expressed by the following equation:

$$\phi n = \frac{\pi}{2}n + \pi(2b_n - 1) \quad b_n: 0, 1 \quad (3)$$

When an interval between two positions is precisely an interval of one frame amount, the interval is an interval of 1250 bit amount. Assuming detection of phases at two bits respectively located at the same positions in two successive bursts (a present burst and a subsequent burst which are displaced by one frame amount), the phase at the bit of the subsequent burst is displaced by π from that of the present burst as shown in the following equation:

$$\phi_n - \phi_{n+1250} = \frac{\pi}{2}\{n - (n + 1250)\} + \pi(2b_n - 1) \quad (4)$$
$$\qquad\qquad\qquad - \pi(2b_{n+1250} - 1)$$
$$\qquad\qquad\qquad = -1250 \cdot \frac{\pi}{2} = \pi$$

In this case, it is possible to calculate the phase difference Δφ by calculating the difference between the phases of the two bits and subtracting π from the difference. For example, when a phase θ1 and a phase θ2 are respectively detected at the timing t1 shown in FIG. 4C and the timing t2, shown in FIG. 4C, which is one-frame behind the timing t1, a difference between the phase θ2 and a phase θ1' obtained by shifting the phase θ1 by π is the phase difference Δφ which is to be calculated.

While the demodulating unit 110 corrects the offset amount of the carrier frequency by calculation in this embodiment, another method may be employed. For example, the offset amount may be corrected by changing an oscillation frequency of the oscillator 108 for determining the reception frequency and the transmission frequency. Alternatively, the offset amount may be corrected by combination of correction of data by calculation and correction of the oscillation frequency of the oscillator.

While the phase difference is detected from the phases of the two bursts received in the two successive frames in this embodiment, the phase difference may be detected from phases of two bursts received in two frames which are distant at a longer time interval.

The offset amount of the carrier frequency may be detected based on a phase fluctuation obtained by a statistical processing, such as averaging, from differences obtained not only by detecting a difference between phases of two arbitrary bursts but also by detecting a difference among phases of a plurality of bursts (more than two bursts).

While in this embodiment the offset amount of the carrier frequency is detected by detecting a phase based on a correlation value at the sync. bit portion included in one burst signal, the phase difference between two bursts may be detected by detecting phases of the bursts by other suitable methods.

For example, after a phase of a signal corresponding to a specific known bit included in the received burst data is detected, the offset amount of the carrier frequency may be detected based on a phase difference between the specific symbols of the two received burst data.

After a phase difference is detected by calculating a correlation function between a known bit pattern other than the sync. bit portion included in the received burst data and a known bit pattern previously stored in the receiver, the offset amount of the carrier frequency may be detected based on the phase difference between the two burst data.

After phases of demodulated signals at specific known bit portions of the received burst data are detected, the offset amount of the carrier frequency may be detected based on a phase difference between demodulated signals of the two burst data.

After correlation between a demodulated signal of a specific known bit of the received burst data and a previously stored demodulated signal of the specific known bit in the receiver is detected to detect phases of the demodulated signals, the offset amount of the carrier frequency may be detected based on a phase difference between the demodulated signals of the two burst data.

The offset amount of the carrier frequency may be detected as follows. Specifically, after a correlation between a specific known bit pattern of the sync. bit portion included in the first received burst data and the same pattern previously stored in the receiver is detected to calculate a channel estimation value, a known bit pattern of a burst data to be subsequently received is estimated based on the channel estimation value. A phase difference is detected by comparing a phase of the estimated known bit pattern and a phase of the known bit pattern of the subsequent burst data actually received. Based on the detected phase difference, the offset amount of the carrier frequency is detected.

While the present invention is applied to the reception system of the radio telephone device in this embodiment, the present invention is not limited thereto. It is needless to say that the present invention can be applied to other TDMA reception devices.

According to the present invention, since the offset amount of the carrier frequency is detected based on the phase difference detected from the phases of the two burst data, the time interval between the two comparison points is considerably increased, as compared with that used when the phase difference is detected within one burst, which allows the accurate detection of the offset amount of the carrier frequency without any influence by the noise. As a result, it is possible to correct the offset amount of the carrier frequency with accuracy. Accordingly, it is possible to obtain precise received data subjected to the satisfactory processings for correcting the offset amount of the carrier frequency, which leads to improvement of communication quality.

Since the phase is detected at only one point in one burst, even if the signal has only one portion including the known bit pattern having a comparatively large data amount, it is possible to detect the offset amount of the carrier frequency with accuracy based on only the phase detected on the basis of the known bit pattern having the large data amount.

Moreover, since it is sufficient to detect the phase at only one position in one burst, it is unnecessary to detect the phase by processing data which has the small number of bits and therefore need not be processed. It is possible to satisfactorily detect the offset amount of the carrier frequency with simple processing. Accordingly, it is possible to reduce the amount of the data used for the process for detecting and correcting the offset amount of the carrier frequency and the processing time in the TDMA system receiver. It is possible to reduce the consumed power of the TDMA system receiver to that extent.

Having described a preferred embodiment of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A receiver for receiving a signal including a periodic burst signal, comprising:

receiving means for receiving a signal modulated by a carrier frequency and including periodic burst signals, each including a tail bit portion, a first half of a data bit portion, a sync bit portion, a second half of said data bit portion, and another tail bit portion, and said receiving means including orthogonal detection means for carrying out orthogonal detection on the received signal;

phase detecting means for detecting a phase of said sync bit portion of a first burst signal of said periodic burst signals and for detecting a phase of said sync bit portion of a second burst signal of said periodic burst signals;

calculating means for calculating an offset amount of said carrier frequency using only the detected phases of said sync bit portions of the first and second burst signals;

correcting means for correcting said offset amount of said carrier frequency;

a single signal oscillator for producing an oscillation signal; and transmission signal generating means, wherein said orthogonal detection means is provided the oscillation signal from the single oscillator to carry out orthogonal detection and the transmission signal generating means is provided the oscillation signal from the single oscillator to generate a transmission signal having a predetermined frequency.

2. The receiver for receiving a signal including a periodic burst signal according to claim 1, wherein said signal received by said receiving means is a signal of a TDMA communication system.

3. A receiver for receiving a signal including a periodic burst signal, comprising:

receiving means for receiving a signal modulated by a carrier frequency and including periodic burst signals, each including a tail bit portion, a first half of a data bit portion, a sync bit portion, a second half of said data bit portion, and another tail bit portion, and said receiver means including orthogonal detection means for carrying out orthogonal detection on the received signal;

phase detecting means for detecting a phase of said sync bit portion of a received burst signal and for detecting a phase of said sync bit portion of a previously received burst signal;

calculating means for calculating an offset amount of the carrier frequency using only the detected phases of said sync bit portions of the received burst signal and the previously received burst signal;

correcting means for correcting said offset amount of the carrier frequency;

a single signal oscillator for producing an oscillation signal; and transmission signal generating means, wherein said orthogonal detection means is provided the oscillation signal from the single oscillator to carry out orthogonal detection and the transmission signal generating means is provided the oscillation signal from the single oscillator to generate a transmission signal having a predetermined frequency.

4. The receiver for receiving a signal including a periodic burst signal according to claim 3, wherein said signal received by said receiving means is a signal of a TDMA communication system.

5. The receiver for receiving a signal including a periodic burst signal according to claim 4, wherein said calculating means comprises arithmetic processing means for carrying out an arithmetic processing, first memory storage means for storing phase information detected by said phase detecting means, second memory storage means for storing the received signal, and a third memory storage means for storing data calculated by said arithmetic processing means.

6. A communication apparatus, comprising:

receiving means for receiving a signal modulated by a carrier frequency and including periodic burst signals, each including a tail bit portion, a first half of a data bit portion, a sync bit portion, a second half of said data bit portion, and another tail bit portion;

a single oscillator for producing an oscillation signal, said receiving means including orthogonal detection means receiving the oscillation signal for carrying out orthogonal detection on the received signal;

phase detecting means for detecting a phase of said sync bit portion of a received burst signal and for detecting a phase of said sync bit portion of a previously stored burst signal;

calculating means for calculating an offset amount of the carrier frequency using only the detected phases of said sync bit portions of the received and previously received burst signals;

correcting means for correcting said offset amount of the carrier frequency;

transmitting means for transmitting an RF signal;

an antenna for receiving and transmitting a radio wave; and selecting means for changing over between said RF signal from said transmitting means fed to said antenna and the received signal fed to said receiving means, wherein the transmitting means is provided the oscillation signal to generate a transmission signal having a predetermined frequency.

7. The receiver for receiving a signal including a periodic burst signal according to claim 1, wherein said correcting means corrects said offset amount by changing a frequency of the oscillation signal generated by the single oscillator.

8. The receiver for receiving a signal including a periodic burst signal according to claim 1, wherein said correcting means corrects said offset amount based on a calculated result obtained when said calculating means carries out arithmetic processing with respect to received data.

9. A method of receiving a signal including a periodic burst signal, comprising the steps of:

receiving a signal modulated by a carrier frequency and including periodic burst signals, each including a tail bit portion, a first half of said data bit portion, a sync bit portion, a second half of a data bit portion, and another tail bit portion;

producing an oscillation signal using a single oscillator;

carrying out orthogonal detection on the received signal using the oscillation signal;

detecting a phase of said sync bit portion of a first burst signal of said periodic burst signals and detecting a phase of said sync bit portion of a second burst signal of said periodic burst signals;

calculating an offset amount of the carrier frequency using only the detected phases of said sync bit portions of the first and second burst signals;

correcting said offset amount of the carrier frequency; and utilizing the oscillation signal to generate a transmission signal having a predetermined frequency.

10. The method of receiving a signal including a periodic burst signal according to claim 9, wherein said signal received in said signal receiving step is a signal of a TDMA communication system.

11. The method of receiving a signal according to claim 9, wherein the received signal is a data signal and said correcting step comprises:

a step of calculating a correlation function between first data and second data in the received signal, a step of a squaring an absolute value of a calculated result of said correlation function, a step of selecting data having maximum energy based on the squared absolute value, a step of reading a previously stored data having maximum energy, a step of comparing phases of said previously stored data and said selected data, and a step of storing said selected data.

12. The method of receiving a signal according to claim 11, wherein in said step of correcting said offset amount of said carrier frequency, said offset amount is corrected by changing an oscillation frequency of the single oscillator.

13. The method of receiving a signal according to claim 9, wherein the received signal is formed of frames each having a burst signal and in said step of detecting phases of the first and second burst signals, phases of two burst signals received in successive frames are detected.

14. The method of receiving a signal according to claim 9, wherein the received signal is formed of frames each having a burst signal and further comprising a step of detecting phases of a plurality of burst signals, wherein phases of said plurality of burst signals received in successive frames are detected and averaged.

* * * * *